United States Patent
Leong et al.

(10) Patent No.: US 8,093,545 B2
(45) Date of Patent: Jan. 10, 2012

(54) LENSLESS USER INPUT DEVICE WITH OPTICAL INTERFERENCE BASED ON DIFFRACTION WITH A SMALL APERTURE

(75) Inventors: Yat Kheng Leong, Selangor (MY); Sai Mun Lee, Pengang (MY); Hung Kwang Lee, Penang (MY); Jin Kiong Ang, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 586 days.

(21) Appl. No.: 12/239,131

(22) Filed: Sep. 26, 2008

(65) Prior Publication Data

US 2010/0078545 A1    Apr. 1, 2010

(51) Int. Cl.
     *G06M 7/00*    (2006.01)
(52) U.S. Cl. .............. 250/221; 250/203.2; 345/157; 345/175
(58) Field of Classification Search ........... 250/203.1, 250/203.2, 221; 345/156, 157, 166, 175, 345/168; 382/312, 313, 315
See application file for complete search history.

(56) References Cited

U.S. PATENT DOCUMENTS

| 7,313,255 B2 | 12/2007 | Machida et al. |
| 2004/0164953 A1* | 8/2004 | Keranen et al. ............... 345/156 |
| 2005/0243055 A1* | 11/2005 | Ranta et al. ................... 345/156 |

* cited by examiner

*Primary Examiner* — Francis M Legasse, Jr.

(57) ABSTRACT

An optical navigation device which uses optical interference to generate navigation images. The optical navigation device includes an optical element, a light source, a sensor array, a navigation engine, and a light shield. The optical element includes a finger interface surface. The light source includes a laser in optical communication with the finger interface surface to provide light to the finger interface surface. The sensor array detects light reflected from the finger interface surface in response to contact between a finger and the finger interface surface. The navigation engine is coupled to the sensor array. The navigation engine generates lateral movement information based on lateral movement of the finger relative to the sensor array. The light shield is between the optical element and the sensor array. The light shield includes an aperture linearly aligned with the sensor array.

20 Claims, 6 Drawing Sheets

LENSLESS USER INPUT DEVICE WITH OPTICAL INTERFERENCE BASED ON DIFFRACTION WITH A SMALL APERTURE

BACKGROUND

Optical navigation devices use a light source to illuminate a navigation surface so that an optical imager can generate digital images for computing motion. For example, an optical imager can image a finger on a surface and generate a navigation signal based on comparisons of sequential images. However, as the size of conventional navigation devices is reduced, the physical space for the optical elements and sensors for detecting the optical navigation input are also reduced.

For example, some conventional optical navigation device packages have a thickness, or optical height, of about 2.5 mm. The optical height refers to the distance from an optical finger interface surface to a corresponding sensor. The optical height is also referred to as the optical track. An optical height, or thickness, of 2.5 mm is considered too thick for some implementations of handheld devices such as cellular telephones and small portable personal computing (PC) peripherals.

In conventional optical navigation devices which use optical lenses to direct the light from the optical finger interface surface to the corresponding sensor, it may be impractical to reduce the optical height below about 2.5 mm. In attempting to reduce the optical height of conventional optical navigation devices, the lower total optical height makes it difficult to properly mold the imaging lens. This also has the adverse effect of reducing the accuracy of the imaging lens. Tolerances for the optical navigation device also become very tight, and designing and producing an imaging lens according to such tight tolerances increases the cost for the package, due to the complexity of the design.

SUMMARY

Embodiments of a user input device are described. In one embodiment, the user input device includes an optical element, a light source, a sensor array, a navigation engine, and a light shield. The optical element includes a finger interface surface. The light source includes a laser in optical communication with the finger interface surface to provide light to the finger interface surface. The sensor array detects light reflected from the finger interface surface in response to contact between a finger and the finger interface surface. The navigation engine is coupled to the sensor array. The navigation engine generates lateral movement information based on lateral movement of the finger relative to the sensor array. The light shield is between the optical element and the sensor array. The light shield includes an aperture linearly aligned with the sensor array.

In another embodiment, the user input device includes an optical element, a light source, a sensor array, and a light shield. The optical element includes a finger interface surface integrated with a light pipe. The finger interface surface and the light pipe form a unified structure. The light source includes a laser in optical communication with the finger interface surface to provide light to the finger interface surface via the integrated light pipe. The sensor array detects light reflected from the finger interface surface in response to contact between a finger and the finger interface surface. The light shield is between the optical element and the sensor array. The light shield includes an aperture linearly aligned with the sensor array and the finger interface surface. Other embodiments of the user input device are also described.

Embodiments of a method are also described. In one embodiment, the method is a method for operating a user input device. The method includes generating light at a laser light source. The method also includes directing the light through a light guide to illuminate a finger interface surface. The method also includes detecting reflected light at the sensor array that passes through an aperture in a light shield. The reflected light is directed from the finger interface surface in response to a finger at the finger interface surface. The method also includes generating a navigation signal based on the reflected light. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1A:
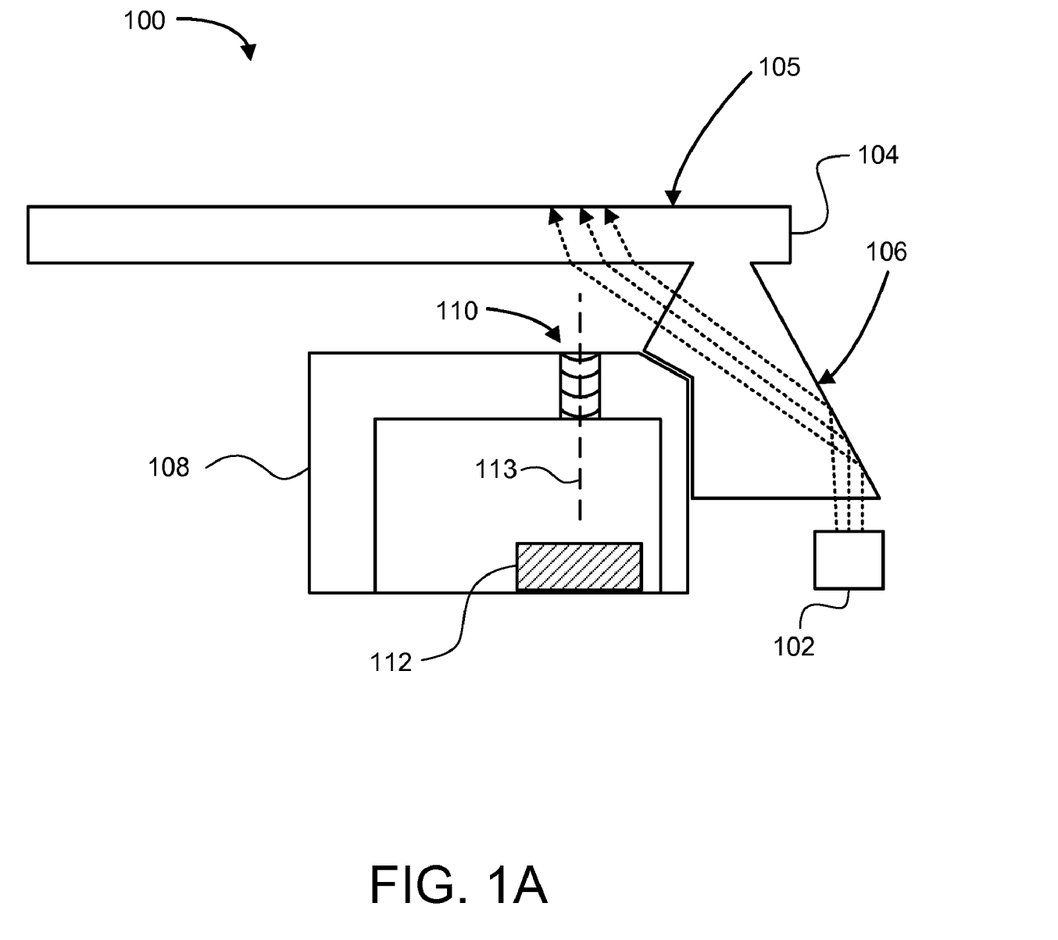
FIG. 1A depicts a schematic diagram of one embodiment of a user input device, in which the user input device is not contacted by a finger.

FIG. 1A depicts a schematic diagram of one embodiment of a user input device 100. The user input device 100 includes a light source 102, an optical element 104 with a finger interface surface 105 and a planar reflective surface 106, a light shield 108 with an aperture 110, and a sensor array 112. In FIG. 1A, the user input device is not contacted by a finger, and in FIG. 1B, the user input device is contacted by a finger.

Figure 1B:
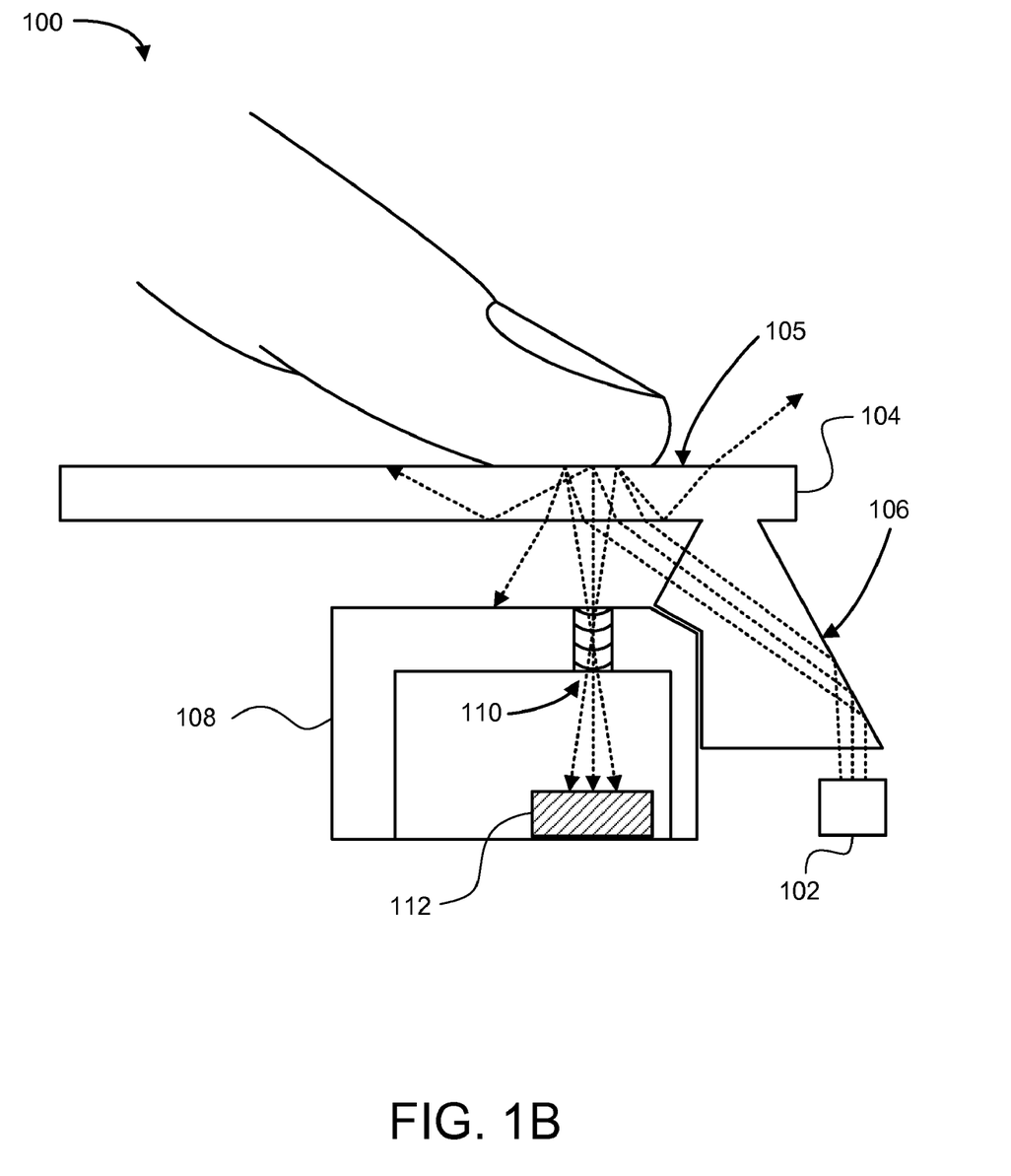
FIG. 1B depicts another schematic diagram of the user input device of FIG. 1A, in which the user input device is contacted by a finger.

In the embodiment of FIGS. 1A and 1B, the light source 102 of the user input device 100 is a laser that directs laser light into the optical element 104. For example, the light source 102 is a vertical cavity surface-emitting laser (VCSEL). Other types of coherent light sources may be implemented in the user input device 100.

The optical element 104 of the user input device 100 is made of light transmissive material, for example, glass or transmissive plastic. The optical element 104 is a combination of a top cover and a light pipe in a unified structure. The optical element 104 reflects light at the planar reflective surface 106 (e.g., through total internal reflection (TIR)) to illuminate a finger (refer to FIG. 1B) at the finger interface surface 105. In some embodiments, the planar reflective surface 106 is polished to further facilitate reflection of the light from the light source 102 within the light pipe structure of the optical element 104. Alternatively, the planar reflective surface 106 of the optical element 104 is coated with a reflective material. One example of a reflective coating that may be applied to the optical element 104 is silver. In another embodiment, the planar reflective surface 106 is formed by diffusing a reflective material into the optical element 104.

The finger interface surface 105 facilitates contact between the finger and the optical element 104. In one embodiment, the finger interface surface 105 is aligned above the aperture 110 of the light shield 108. Upon contact between the finger and the finger interface surface 105, the light at least partially reflects toward the sensor array 112 (refer to FIG. 1B). In particular, contact between the finger and the finger interface surface disrupts the TIR at the finger interface surface 105 and causes light to be reflected toward the sensor array 112 via the aperture 110 of the light shield 108. In some embodiments, the optical element 104 isolates the sensor array from environmental conditions. In other words, the optical element 104 may protect the sensor array from ambient contaminants.

The light shield 108 is located in an optical path of the light reflected from the finger at the finger interface surface 105 of the optical element 104.

The light shield 108 defines the aperture 110, which is aligned within the path of the reflected light. Some embodiments of the aperture 110 have a diameter equal to or less than 0.1 millimeter. Other embodiments may have a smaller or larger aperture 110. For example, the aperture 110 may be between about 0.09 and 0.11 millimeters. Other embodiments of the light shield define the aperture 110 with a different diameter. Further, some embodiments may define the aperture 110 with a shape other than a circular configuration. The size and/or shape of the aperture 110 may at least partially depend on the type of laser light that is generated by the light source 102.

In an embodiment, the aperture 110 is linearly aligned with the light reflected from the finger interface surface 105 of the optical element 104. The aperture 110 is also linearly aligned with the sensor array 112. In one embodiment, the optical element 104 is mounted to the light shield 108 in order to align the optical element 142 with the sensor array 112. In another embodiment, the optical element 104 is mounted separately from the light shield 108. The sensor array 112 is centered on the axis 113 of the aperture 110. By having the aperture 110 aligned between the reflected light and the sensor array 112, the aperture 110 can control the amount of light that passes through the light shield 108 to impinge on the sensor array 112.

Due to the fact that the finger is considered to be a rough surface, the contact between the finger and the finger interface surface 105 scatters the reflected laser light to propagate in many directions. Some of the reflected light passes through the aperture 110 (e.g., in the direction of the axis 113) and is incident on the sensor array 112. In one embodiment, the aperture 110 generates an interference pattern on the sensor array 112.

The sensor array 112 detects the reflected light from the optical element 104 as the light passes through the aperture 110. In one embodiment, the sensor array 112 includes a complementary metal-oxide semiconductor (CMOS) class image sensor. Other embodiments may include other classes of sensor.

In some embodiments, the sensor array 112 detects the motion of the finger relative to the optical element 104. The sensor array 112 generates a signal based on the light incident on the sensor array 112 when the finger is in optical image range of the sensor array 112. In some embodiments, the finger may be within an optical image range of the sensor array 112 without physical contact between the finger and the optical element 104.

In some embodiments, the sensor array 112 includes an array of distinct photodetectors (not shown). For example, the sensor array 112 may include a 16×16 or 32×32 array of distinct photodetectors configured to detect light that is reflected from the illuminated spot on the finger interface surface 105. Each of the photodetectors in the sensor array 112 generates light intensity information that is output as a digital value (e.g., an 8-bit digital value). Other embodiments output analog values, which may be converted to digital values. Image information is captured by the sensor array 112 in frames, where a frame of image information includes a set of simultaneously captured values for all of the distinct photodetectors in the sensor array 112. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

In one embodiment, a navigation engine 158 (described below with reference to FIG. 5) compares successive image frames from the sensor array 112 to determine the movement of image features between frames. In particular, the navigation engine 158 determines movement by correlating common features that exist in successive image frames from the sensor array 112. The movement, or changes, between image frames is expressed in terms of movement vectors, for example, in X and Y directions (e.g., $\Delta X$ and $\Delta Y$). The movement vectors are then used to determine the relative movement between the finger and the input device. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein. Additionally, more details about generating navigation signals are provided below with reference to FIG. 5.

Since the scattered light which reaches the sensor array 112 includes light of different optical phases, and the laser light behaves substantially coherently, a relatively good interference pattern is generated on the sensor array 112. The generated interference pattern correlates with the moving direction of the finger, so that the user input device 100 can generate navigation signals which correspond to the finger movement. The interference pattern is generated by the effect of diffraction with small aperture. As the laser light passes through the aperture 110, the effect of the aperture 110 on the relatively high coherency laser light eliminates the need for an optical lens between the optical element 104 and the sensor array 112. Without the need for an optical lens, the user input device 100 is lensless because there is no lens between the optical element 104 and the sensor array 112. As a result, the optical track of the user input device 100 can be reduced. Additionally, the complexity and cost of manufacturing the user input device 100 is also reduced. Other embodiments may have further advantages.

Figure 2:
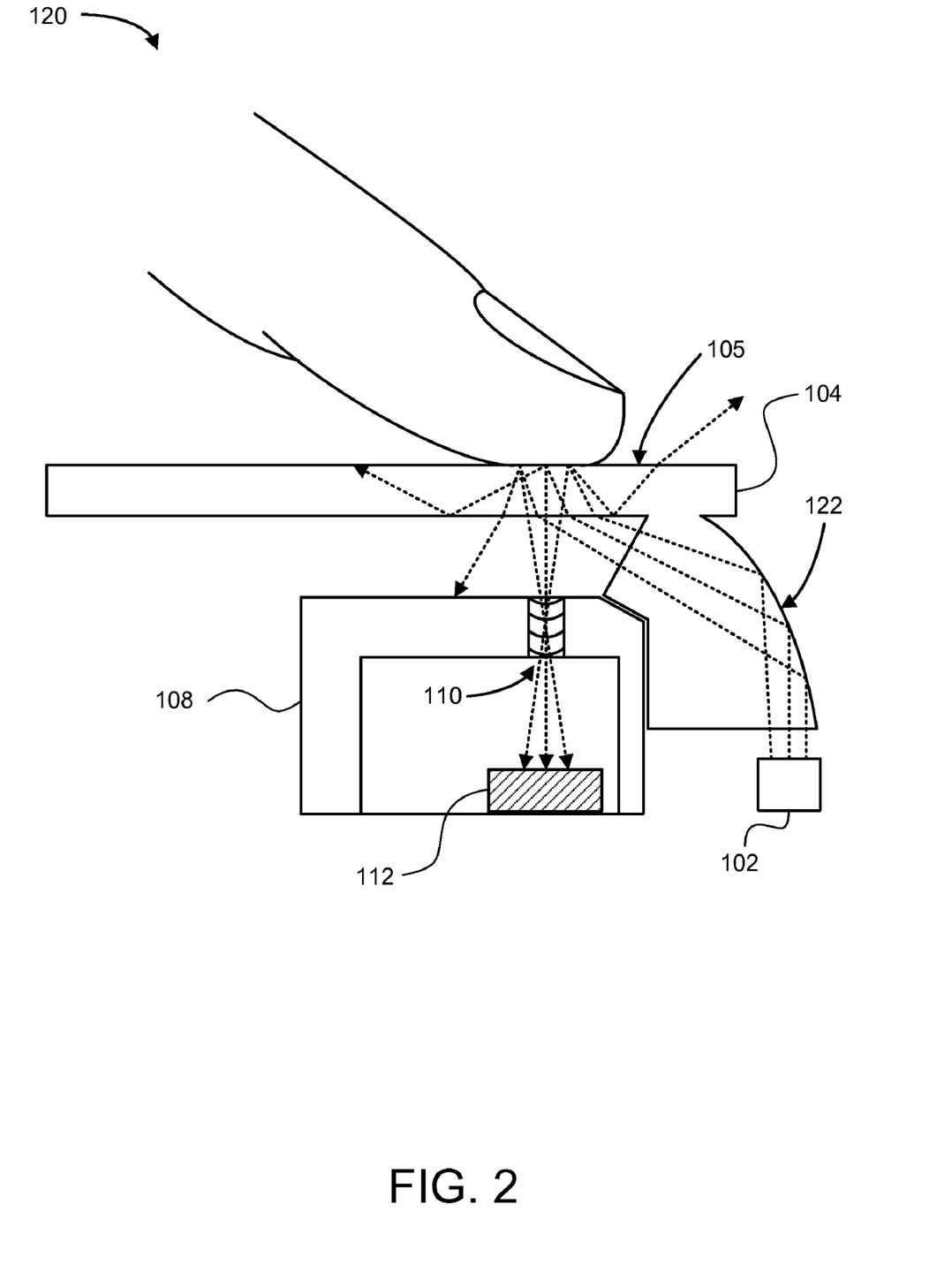
FIG. 2 depicts a schematic diagram of another embodiment of the user input device.

FIG. 2 depicts a schematic diagram of another embodiment of a user input device 120. The same numbers used in both FIGS. 1B and 2 indicate the same or similar components as the components described above in relation to the user input device 100 of FIG. 1B. The illustrated user input device 120 of FIG. 2 includes a non-planar reflective surface 122 on the optical element 104. The non-planar reflective surface 122 may be optically polished to facilitate total internal reflection (TIR) within the optical element 104. In one embodiment, the non-planar geometry of the non-planar reflective surface 122 produces a converging effect on the light from the light source 102. In another embodiment, the non-planar geometry of the non-planar reflective surface 122 produces a collimating effect (not shown) on the light generated by the light source 102. The non-planar reflective surface 122 may have optical properties to further facilitate TIR of the light directed into the optical element 104 from the light source 102. For example, the non-planar reflective surface 122 may be formed by coating the non-planar surface 122 with a reflective material such as silver. Alternatively, the non-planar reflective surface 122 may be formed by diffusing a reflective material into the optical element 104.

Figure 3:
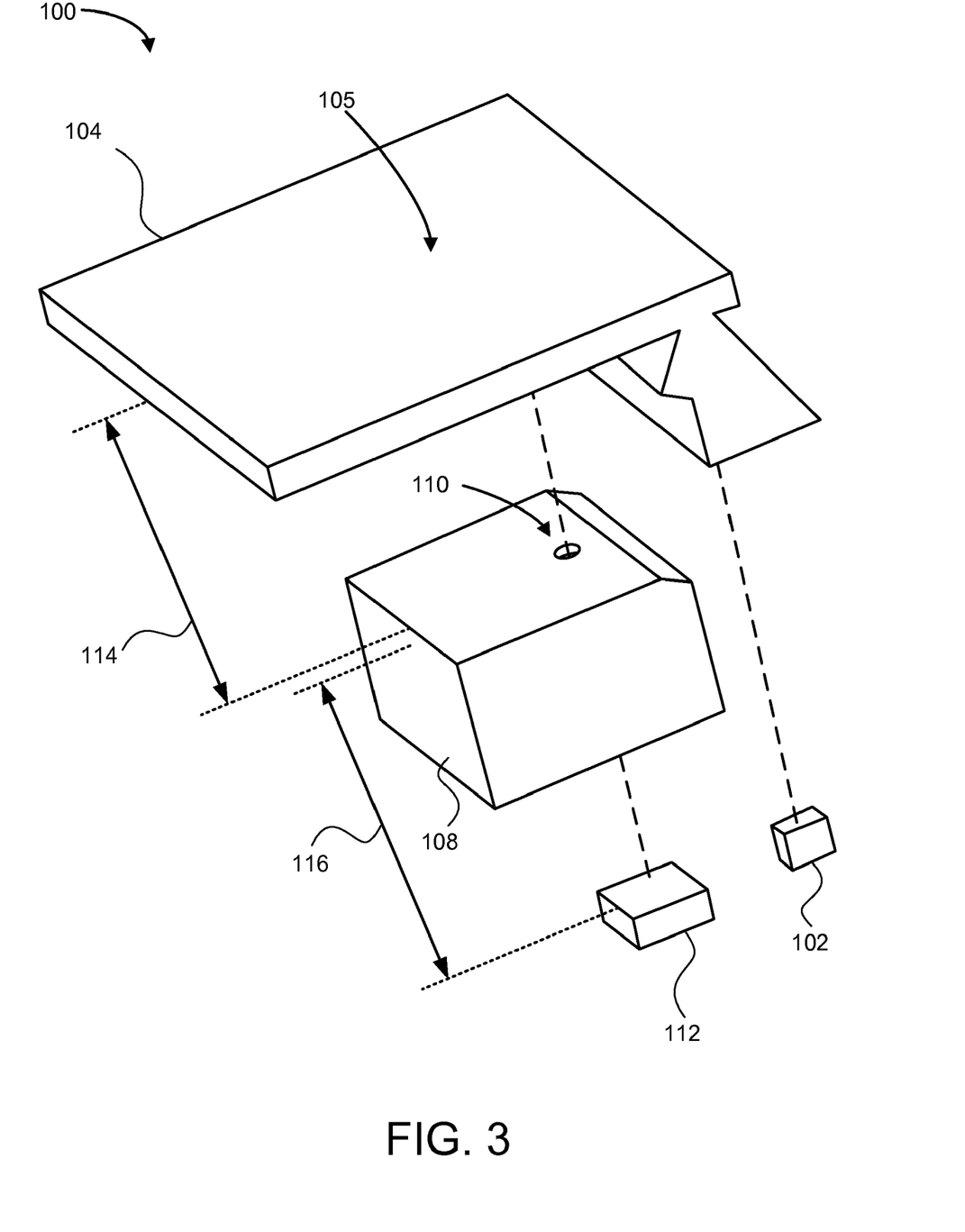
FIG. 3 depicts an exploded view of the user input device of FIG. 1B.

FIG. 3 depicts an exploded perspective view of the user input device 100 of FIG. 1B. The depicted view of the user input device 100 illustrates the orientation of the light source 102, the optical element 104, the light shield 108 with the aperture 110, and the sensor array 112. In one embodiment, the light shield 108 has a complementary geometry to fit the geometry of the optical element 104. In other words, the geometries of the light shield 108 and the optical element may be arranged to align and/or mount the optical element 104 relative to the light shield 108.

In some embodiments, the user input device 100 includes a first gap 114 between the optical element 104 and the light shield 108. The first gap 114 is the distance between the bottom side of the optical element 100 and the top of the light shield 108. A second gap 116 is at least partially defined between the sensor array 112 and the light shield 108. The second gap 116 is the distance between the top surface of the sensor array 112 and the inside bottom surface of the top of the light shield 108.

In some embodiments of the user input device 100, the total optical track of the device 100 is equal to or less than 1.8 millimeters. The optical track of the user input device 100 is the distance from the finger interface surface 105 of the optical element 104 to the sensor array 112. In other embodiments, the optical track of the user input device 100 is less than about 2.2 millimeters. In other embodiments, the optical track of the user input device 100 is less than about 1.5 millimeters. In other embodiments, the optical track of the user input device 100 is between about 1-2 millimeters. For a user input device 100 with an optical track of about 1-2 millimeters, the diameter of the aperture 110 is about 0.1 millimeters. A relatively small optical track facilitates implementation of the user input device 100 in spatially constrained systems such as handheld computing devices, cellular telephones, personal digital assistants (PDAs), personal music players, and so forth.

Figure 4:
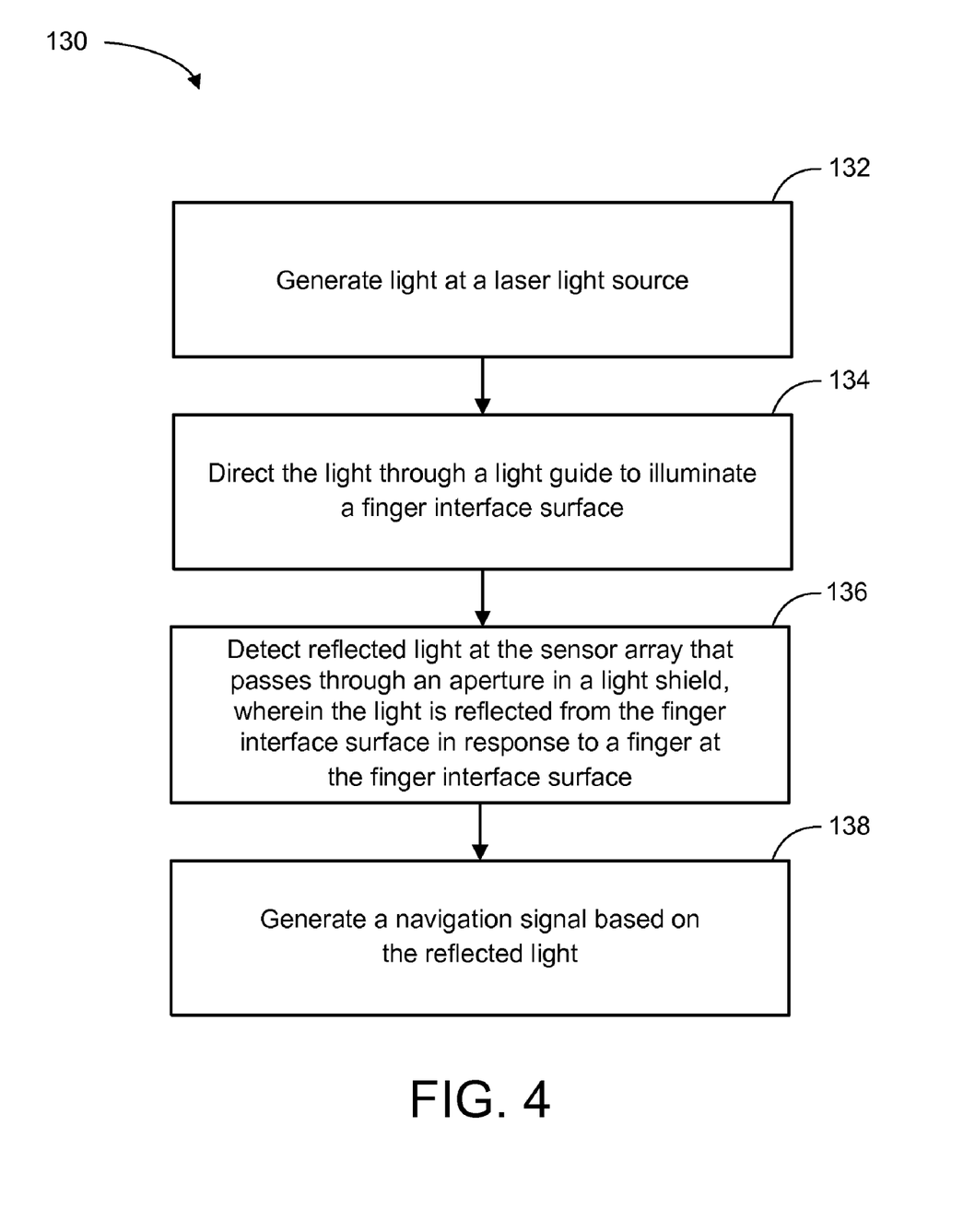
FIG. 4 depicts a flow chart diagram of one embodiment of a method for operating a user input device.

FIG. 4 depicts a block diagram of one embodiment of a method 130 for operating a user input device such as the user input device 100 of FIGS. 1A and 1B or the user input device 120 of FIG. 2. Although the method 130 is described in conjunction with the user input device 100 of FIGS. 1A and 1B, other embodiments of the method 130 may be implemented in conjunction with other types of user input devices.

At block 132, the laser light source generates light such as a coherent light. At block 134, the optical element 104 directs the light through the light guide portion of the optical element 104 and into the top cover of the optical element 104. This allows the light to illuminate the finger interface surface 104 of the optical element 104. Upon illumination of a finger or another object at the finger interface surface 104, the light is reflected back from the finger interface surface 105 toward the sensor array 112. At block 136, the sensor array 112 detects the reflected light that passes through the aperture 110 in the light shield 108. As explained above, the aperture 108 in the light shield 110 functions to block out at least part of the reflected light and, hence, improve the quality of the resulting image obtained by the sensor array 112. At block 138, the user input device 100 generates a navigation signal based on the reflected light and, more specifically, based on the images obtained from the reflected light sensed at the sensor array 112.

Figure 5:
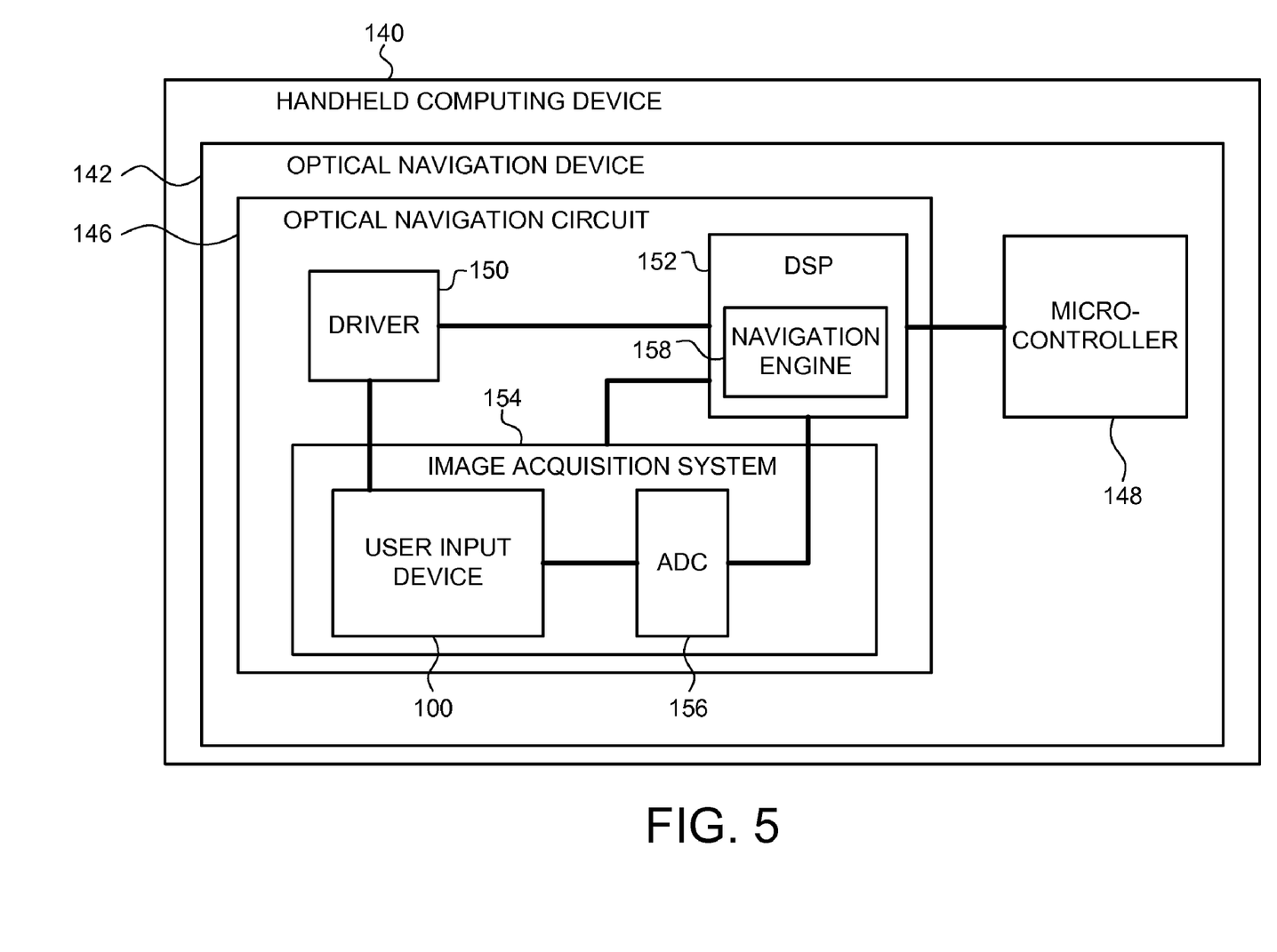
FIG. 5 depicts a schematic block diagram of one embodiment of an optical navigation system.

FIG. 5 depicts a schematic block diagram of one embodiment of a handheld computing device 140. The handheld computing device 140 utilizes the user input device 100, as described below, to facilitate user input. Examples of handheld computing devices 140 which may utilize the user input device 100 include handheld communications devices such as cellular telephones and global positioning system (GPS) devices. Additionally, other types of electronic peripherals such as personal music players, personal digital assistants (PDAs), and so forth may utilize the handheld computing device 140.

By implementing the user input device 100 in the handheld computing device 140, the user input device 100 may facilitate, for example, user input to navigation content on a display device (not shown) of the handheld computing device. Additionally, the user input received through the user input device 100 may facilitate other types of user-controlled functionality including, but not limited to, volume controls, audio playback selections, browser controls, and so forth. The types of user-controlled functionality that may be implemented with the user input device 100 may depend on the type of functionality generally provided by the handheld computing device 140. Also, although FIG. 5 specifically illustrates a handheld computing device 140, the user input device 100 (or 120) may be utilized in electronic devices which are portable, but not necessarily held in a user's hand, or devices which are generally considered to be no portable.

The handheld computing device 140 of FIG. 5 includes an optical navigation device 142. Although the optical navigation device 142 is shown with certain components and described herein as implementing certain functionality, other embodiments of the optical navigation device 142 may include fewer or more components to implement less or more functionality.

The illustrated optical navigation device 142 includes an optical navigation circuit 146 and a microcontroller 148. In general, the optical navigation circuit 146 generates signals representative of finger or other navigation movement at the user input device 100. The optical navigation circuit 146 then transmits one or more signals to the microcontroller 148. Exemplary types of signals transmitted from the optical navigation circuit 146 to the microcontroller 148 include channel quadrature signals based on $\Delta X$ and $\Delta Y$ relative displacement values. These signals, or other signals, may be indicative of a relative movement between the finger and the user input device 100. Other embodiments of the optical navigation circuit 146 may transmit other types of signals to the microcontroller 148. In one embodiment, the microcontroller 148 implements a variety of functions, including transmitting data to and receiving data from a host computer system or other electronic device (not shown).

In order to generate the navigation signals, the depicted optical navigation circuit 146 includes a driver 150, a digital signal processor (DSP) 152, and an image acquisition system (IAS) 154. The image acquisition system 154 includes the user input device 10 and an analog-to-digital converter (ADC) 156. Other embodiments of the optical navigation circuit 146 and or the image acquisition system 154 may include fewer or more components to implement less or more functionality.

In one embodiment, the driver 150 of the optical navigation circuit 146 controls the operation of the light source 102 (see FIG. 1B) to generate the light signal that is transmitted to the finger interface surface 105. The reflected light signal is then received and detected by the sensor array 112 of the user input device 100, as described above.

In one embodiment, the user input device 100 generates one or more analog electrical signals corresponding to incident light on the sensor array 112. The user input device 100 then transmits the analog signals to the analog-to-digital converter 156. The analog-to-digital converter 156 converts the electrical signals from analog signals to digital signals and then passes the digital signals to the digital signal processor 152.

After the digital signal processor 152 receives the digital form of the signals from the analog-to-digital converter 156 of the image acquisition system 154, the digital signal processor 152 may perform additional processing using the electrical signals. The digital signal processor 152 then transmits one or more signals to the microcontroller 148, as described above. In some embodiments, the digital signal processor 152 includes a navigation engine 158 to generate lateral movement information based on lateral movement of the finger relative to the sensor array 112. Other embodiments of the navigation engine 158 may generate other types of movement information.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention are described and illustrated, the scope of the invention is to be defined by the claims appended hereto and their equivalents. The scope of the invention is not to be limited to the specific forms or arrangements of parts so described and illustrated herein.

What is claimed is:

1. A user input device comprising:
an optical element comprising a finger interface surface;
a light source comprising a laser in optical communication with the finger interface surface to provide light to the finger interface surface;
a sensor array to detect an interference pattern of unfocused light reflected from the finger interface surface in response to contact between a finger and the finger interface surface;
a navigation engine coupled to the sensor array, the navigation engine configured to generate lateral movement information based on lateral movement of the finger relative to the sensor array; and
a light shield between the optical element and the sensor array, the light shield comprising an aperture linearly aligned with the sensor array, wherein the aperture has a dimension to diffract the light reflected from the finger interface surface and generate the interference pattern at the sensor array.

2. The user input device of claim 1, wherein the light shield defines the aperture with a diameter approximately equal to or less than 0.1 mm.

3. The user input device of claim 1, wherein the optical element and the light shield at least partially define a gap between the optical element and the light shield at approximately the aperture of the light shield.

4. The user input device of claim 1, wherein the optical element and the light shield define a first gap between the optical element and the light shield, and the light shield and the sensor array define a second gap between the light shield and the sensor array, wherein the first and second gaps are substantially aligned with the aperture of the light shield.

5. The user input device of claim 1, wherein a distance between the finger interface surface and the sensor array is less than about 2 mm.

6. The user input device of claim 1, wherein the laser comprises a vertical cavity surface-emitting laser (VCSEL).

7. The user input device of claim 1, wherein the optical element further comprises a light pipe integrated with the finger interface surface.

8. The user input device of claim 1, wherein a path of the light reflected from the finger interface surface to the sensor array is lensless.

9. The user input device of claim 2, wherein the light shield defines the aperture with a diameter approximately between 0.09 mm and 0.11 mm.

10. The user input device of claim 5, wherein a distance between the finger interface surface and the sensor array is approximately between 0.9 mm and 1.1 mm.

11. The user input device of claim 7, wherein the light pipe comprises a polished optical surface to facilitate total internal reflection of the light within the light pipe.

12. The user input device of claim 7, wherein the light pipe defines a fitted geometry to facilitate mounting the optical element in alignment with the light shield.

13. The user input device of claim 11, wherein the polished optical surface defines a planar geometry.

14. The user input device of claim 11, wherein the polished optical surface defines a curved geometry.

15. A system comprising:
a handheld computing device; and
a user input device coupled to the handheld computing device to receive user input for the handheld computing device, the user input device comprising:
an optical element comprising a finger interface surface integrated with a light pipe, wherein the finger interface surface and the light pipe form a unified structure;
a light source comprising a laser in optical communication with the finger interface surface to provide light to the finger interface surface via the integrated light pipe;
a sensor array to detect an interference pattern of unfocused light reflected from the finger interface surface in response to contact between a finger and the finger interface surface, wherein a path of the light reflected from the finger interface surface to the sensor array is lensless; and
a light shield between the optical element and the sensor array, the light shield comprising an aperture linearly aligned with the sensor array and the finger interface surface, wherein the aperture has a dimension to diffract the light reflected from the finger interface surface and generate the interference pattern at the sensor array.

16. The user input device of claim 15, wherein the optical element covers the sensor array and the aperture of the light shield to prevent ambient contamination of the user input device.

17. The user input device of claim 15, wherein the light shield defines the aperture with a diameter approximately equal to or less than 0.1 mm, and wherein the aperture is linearly aligned with a center of illumination of the light at the finger interface surface.

18. The user input device of claim 15, wherein the handheld computing device comprises a mobile telephone handset.

19. The method of claim 15, further comprising forming a series of navigation images passing through the aperture in the light shield, wherein the light shield defines the aperture with a diameter approximately equal to or less than 0.1 mm.

20. A method for operating a user input device, the method comprising:
   generating light at a laser light source;
   directing the light through a light guide to illuminate a finger interface surface;
   detecting an interference pattern of unfocused reflected light at the sensor array that passes through an aperture in a light shield, wherein the light is reflected from the finger interface surface to the sensor array along a lensless path in response to a finger at the finger interface surface, wherein the aperture has a dimension to diffract the light reflected from the finger interface surface and generate the interference pattern at the sensor array; and
   generating a navigation signal based on the reflected light.

* * * * *